(12) United States Patent
Wei

(10) Patent No.: US 7,839,112 B2
(45) Date of Patent: Nov. 23, 2010

(54) TORQUE CONTROL CIRCUIT FOR IMPACT TOOL

(75) Inventor: Chen-Ku Wei, Taichung Hsien (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 396 days.

(21) Appl. No.: 12/136,072

(22) Filed: Jun. 10, 2008

(65) Prior Publication Data

US 2009/0302798 A1    Dec. 10, 2009

(51) Int. Cl.
    *G05B 1/00* (2006.01)
(52) U.S. Cl. .................. 318/689; 318/432; 318/434; 323/220; 323/224; 323/223
(58) Field of Classification Search ........... 318/689, 318/432, 433; 323/220, 224, 223
    See application file for complete search history.

(56) References Cited

U.S. PATENT DOCUMENTS

| | | | | |
|---|---|---|---|---|
| 3,612,236 A | * | 10/1971 | Fernstrom et al. | 192/56.56 |
| 4,056,763 A | * | 11/1977 | Debrie et al. | 318/675 |
| 4,179,786 A | * | 12/1979 | Eshghy | 29/407.03 |
| 4,238,978 A | * | 12/1980 | Leone | 81/480 |
| 4,393,734 A | * | 7/1983 | Thorn et al. | 81/468 |
| 4,562,746 A | * | 1/1986 | Petit | 73/862.23 |
| 4,606,489 A | * | 8/1986 | Steinhart et al. | 228/102 |
| 5,155,473 A | * | 10/1992 | Oketani et al. | 340/680 |
| 6,134,973 A | * | 10/2000 | Schoeps | 73/862.23 |
| 6,313,603 B1 | * | 11/2001 | Poullain et al. | 318/809 |
| 6,516,896 B1 | * | 2/2003 | Bookshar et al. | 173/1 |
| 7,068,000 B1 | * | 6/2006 | Chung | 318/434 |
| 7,562,589 B2 | * | 7/2009 | Anjanappa et al. | 73/862.23 |

* cited by examiner

*Primary Examiner*—Rita Leykin
(74) *Attorney, Agent, or Firm*—Leong C. Lei

(57) ABSTRACT

A torque control circuit includes a motor driving circuit, a motor operating current detection circuit, a reference voltage generation circuit, a maximum motor current setting circuit, a torque setting circuit, an information output circuit, a regulated-voltage power supply circuit, a motor operating temperature detection circuit, and a control circuit. The control circuit includes an integrated circuit to carry out functions of reading information detection sources, processing, and instruction for execution of torque control and output terminals of the reference voltage generation circuit, the maximum motor current setting circuit, the motor operating temperature detection circuit, and the motor impedance torque setting circuit are respectively connected to corresponding input terminals of the integrated circuit to carry out desired control of torque supplied to the impact tool.

31 Claims, 2 Drawing Sheets

TORQUE CONTROL CIRCUIT FOR IMPACT TOOL

BACKGROUND OF THE INVENTION (a) Technical Field of the Invention

The present invention relates to a torque control circuit of an impact tool, which provides a torque control technique that, at the time when the impact tool is operated to hit and tighten a bolt, realizes constant current control and employs an integrated circuit to effect precise control of output impact torque in response to the variation of temperature and voltage.

(b) Description of the Prior Art

An impact tool is used to effect successive impact for tightening a tightened object. Using a sensor to detect the tightened degree of the tightened object at the moment just after an impact in order to effect control of torque is very difficult. Conventionally, displacement sensors are used for such detection, but the result is imprecise and the construction is complicated. Thus, commercialized products were hardly seen heretofore.

With the advance of the power tools, rechargeable impact tools are available in the market, which are of smaller size, lighter weight and are more suitable for carrying than the conventional impact tools that includes a power cable connectable with electric mains, but still provides sufficient output torque to handle bolt/screw tightening. However, the rechargeable impact tool lacks proper torque control means so that the application thereof cannot be expanded, leading to only small quantity manufacturing. If a torque control function can be added, then the rechargeable impact tool may replace the conventional bulky and heavy drill tools.

An idea solution is to make use of the feature that measurement of reduction of motor rotational speed corresponding to power at the time when a direct-current (DC) motor that is arranged inside a housing of an impact tool and provides the primary power output encounters a resistance in its rotation to drive an impact block at a front tip of the tool to work can be converted into a torque. An electronic circuit is used automatically detect the rotational speed for the conversion calculation of corresponding torque value. When a preset torque level is reached, a control of stopping the rotation is effected. However, this is just an ideal condition and is not effective in precisely controlling torque.

Since, theoretically, if the voltage maintains unchanged, by not taking the influence caused by the operating temperature of an electric motor, when the output of the electric motor is subjected to resistance, the characteristics of reduction of internal equivalent resistance, increase of electrical current, and increase of output torque are shown. Thus, by detecting the rotational speed to correspond to the output torque of the electric motor, a reference for adjusting and controlling the maximum and final rotating and tightening torque can be obtained. However, detecting rotational speed to correspond to the torque of the electric motor is still of various variable factors, and further, resolution and instantaneity of monitoring of the rotational speed of the electric motor by means of electronic circuits are insufficient. In practical applications, the voltage level of the rechargeable batteries reduces with time elapse. Further, temperature also causes influences on the electrical resistance of the motor. All these make it very doubtful for the precision of control by detecting the rotational speed of an electric motor to immediately calculate an instantaneous torque of the motor.

Further, environmental protection makes Lithium or Lithium based rechargeable batteries a current main stream of the rechargeable batteries. The Lithium battery has a feature that is different from a Ni—Cd battery or NiMH battery in that the output voltage reduces with the reduction of the battery capacity. The conventional impact tools that are powered by Lithium batteries exhibit a significant difference in output torque between the condition when it is just fully charged and the condition when the Lithium battery has been consumed for quite a period. This makes a trouble to the general users.

In view of the above discussed problems that the conventional impact tool is not effective in carrying out precise control, the present invention is aimed to provide an impact tool that overcomes the problems.

SUMMARY OF THE INVENTION

The primary purpose of the present invention is to provide an impact tool which comprises an electric motor that is arranged inside a housing and has an output spindle that drives rotation of an impact block, springs, and slide blocks. The slide blocks rotate with a tightened object, such as bolt. When slide blocks encounter resistance or impedance, the impact block is stopped by the slide blocks and compresses downward the springs until the compression of the springs exceeds a predetermined distance. At that time, the impact block disengages from the slide blocks to have the impact block forced by the springs to move in a tangential direction to impart a horizontal impulse to impact the slide blocks, causing the slide blocks to instantaneously hit and twist the tightened object for tightening or to twist and withdraw the tightened object for loosening. (The resistance occurring in a loosening operation is the resistance against loosening operation.) The impact block, after the impact, immediately stopped by the slide blocks again for compressing the springs. In this way, the impact block successively hits the slide blocks for tightening the bolt or for withdrawing the bolt from the tightened condition.

In the course when the impact block compresses the springs, due to horizontal pushing by the rotation of the electric motor and the resistance against downward compression of the springs, the current of the electric motor gradually increases. During the course, the variation of the current corresponds to the speed of the electric motor and the position of the impact block. Thus, when the slide blocks encounters resistance, during the course that the impact friction increases, with the current reaching a given level, a constant current circuit is used to control the maximum current flowing through the electric motor so that at the very time point when the current raises to the current level, the maximum rotational speed and the initiation of the control of the impact block are determined and maintained. Once reaching the current level, even the impedance of the motor further increases, due to the fact that the current is being fixed and held, the rotational speed of the motor does not increase, making the horizontal impulse that the impact block imparts to the slide blocks by the impact block disengaging from the slide blocks and forced by the springs fixed, whereby the supply voltage remains unchanged and the time point when the current of the electric motor is detected reaching the preset level (namely the point of setting the preset current level) indicates the motor speed reaches a given level, determining the fixed impulse for the subsequent impacts. Thus, the torque control circuit of the impact tool in accordance with the present invention is first arranging an electric motor operating current detection circuit and a maximum electric motor current setting circuit (namely the previously mentioned constant current circuit) and carrying out comparison therebetween in order to allow the maximum electric motor current setting circuit to hold and prevent the current of the electric motor from exceeding the preset current level and the time point of reaching the level.

However, with sufficient supply of voltage, after impacting a bolt or a nut with a fixed force for several times, the impulse of the subsequent impacts has less degree of tightening on the bolt or nut. Thus, for the sake of saving power, the torque control circuit of the impact tool in accordance with the present invention has a design that at the time point when the current of the electric motor raises to a preset current level, the previously described maximum electric motor current setting circuit is employed to control the current and stays for a short and fixed period of time (a fixed period of time indicating a fixed number of impacts) to thereafter automatically stop whereby the desired torque can be obtained with a most power saving manner.

Further, different from a power screwdriver that, at the time when encountering resistance against the rotation, causes the electric motor to almost stop for a period of time, the impact tool induces repeated impact each time it is subjected to resistance, with the electric motor maintaining high speed rotation. The high speed rotation fast consumes electric power. Thus, after a period of time of operation, the voltage level of the battery gets lowered, causing the current flowing into the electric motor to reduce and the torque that works against the tightening resistance reducing, meaning the force of each impact reducing. Under this condition, to ensure a wider range of torque control, the torque control circuit of the impact tool in accordance with the present invention elongates the time period of impact to provide an increased tightening force after the current of the electric motor reaches a preset level so as to widen the torque control range and thus obtaining stable output of torque. The torque control circuit of the impact tool of the present invention exhibits a design that effects torque control in response to the parameters of power supply voltage.

The impact process that the torque control circuit of the impact tool is to carry out successive "n" times of impact, which requires a period of time to complete, for example the impacts required to reach the current level plus the number of impacts for the fixed impulse. The detection of voltage does not need to be completed in a very short period of time. The torque control circuit of the impact tool in accordance with the present invention employs an intergraded circuit that constitutes a control circuit thereof to carry out dynamical detection and torque is adjusted by adjusting the current level as desired. Further, a look-up table of various voltages and various currents corresponding to the output torques is first empirically determined and the contents of the table is built in the integrated circuit so that during the operation, the integrated circuit dynamically and repeated bases on a set torque value and the detected voltages to provide a constant current to the maximum electric motor current setting circuit of the electric motor and a fixed output torque can be ensured regardless the variation of the power supply voltage.

Taking an impact tool that uses a Lithium battery as a power source as an example for explanation, the Lithium battery exhibits the characteristics of reducing output voltage with the reduction of battery capacity. Such a characteristic can be overcome by voltage compensating torque. However, when the battery capacity gets lowered, the maximum output torque reduces, making the torque setting range narrowed. Taking four serially connected Lithium batteries as an example, the fully charged voltage is 16.4V and a low-voltage protection voltage level is 11.0V. Under the 16.4V fully-charged voltage, an idle current reaches 7.0 amperes. To effect impact, the current has to be greater than 7.0 amperes. For an output greater than 7.0 amperes, the output torque exceeds 700 kg-cm (the maximum torque being around 1800 kg-cm). When the battery voltage drops to 14.3V (which is still far away from the lowest voltage level 11.0V), the maximum torque output is only 800 Kg-cm. To conclude, using Lithium batteries to serve as a power source for impact tool is still ineffective.

A major cause is that under the load of impact block, the power supply voltage for the electric motor has a significant difference in efficiency between high and low levels of voltage. When a high voltage is supplied, the electric motor has a high rotational speed and the high speed rotation, although increasing the frictional force of the impact block, increases the horizontal impact speed (V) that the impact block is released, making the impulse (P=MV) increased and thus increasing the output torque. When a low voltage is supplied, the rotational speed of the motor is low and the resistance of the impact block is low. The impact stroke can be done with the current being small. Thus, the maximum impulse of each impact is low and the overall maximum output torque cannot be made great. To allow the impact tool to operate for a long period of time with a fixed torque and fixed torque control range, the number of serially connected batteries can be increased to five. In this way, the lowest voltage level can be raised to around 14.0V, but a high voltage of 20V may be reached. Using the 20V high voltage to drive an electric motor that is of an operating voltage of around 14.4V may lead to the risks of over-heating and burning.

The torque control circuit of the impact tool in accordance with the present invention uses a maximum electric motor current setting circuit, together with a control circuit, to instruct a semiconductor power device to cut off an electric motor driving circuit, which is realized with pulse width modulation (PWM) techniques, such as the previously described integrated circuit having built therein a look-up table of various voltages and various currents corresponding to output torques. What is supplemented here is that the built-in look-up table may also provide outputs of voltages and torques corresponding to the PWM work loads. Thus, with the electric power of the batteries being sufficiently supplied to provide a high voltage or adding an additional battery to raise voltage for enhancing the torque setting range, the motor is not operated in an all period ON condition and is instead subjected to the control of ON/OFF operation of PWM so that the operation efficiency of the electric motor under high voltage is maintained high and average wattage is controlled by circuits featuring PWM and a maximum electric motor current setting circuit to eliminate the risk of over-heating.

Further, the motor temperature also causes influence of the efficiency. Thus, the torque control circuit of the impact tool in accordance with the present invention also considers temperature as an influencing factor and includes the influence caused by temperature in the look-up table built in the integrated circuit. The integrated circuit reads detected temperature from an electric motor operating temperature detection circuit and carries out analysis and determination. Thus, in total, multiple factors, including the battery voltage, PWM, and variation of operating temperature, are considered and this makes the control of torque very complicated. However, this can be done with a digital look-up table pre-established in the integrated circuit and the torque control of the impact tool can be eased.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
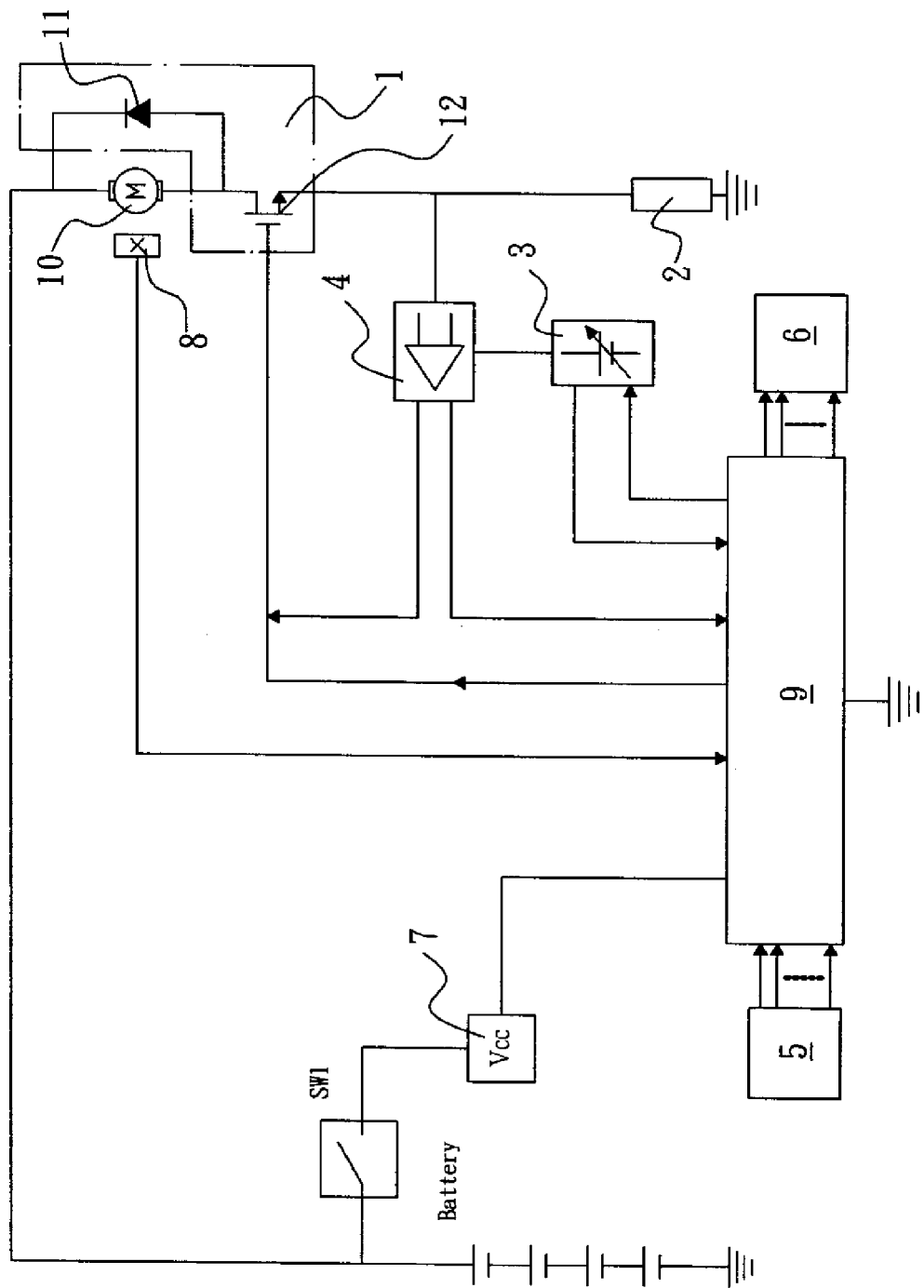
FIG. 1 is a block diagram illustrating the construction and signal transmission of a torque control circuit for impact tool in accordance with the present invention.

FIG. 1 is a block diagram illustrating the construction and signal transmission of a torque control circuit for impact tool in accordance with the present invention. As shown in the drawing, the torque control and battery discharge protection circuit for impact tool in accordance with the present invention is generally comprised of an electric motor driving circuit 1, an electric motor operating current detection circuit 2, a reference voltage generation circuit 3, a maximum electric motor current setting circuit 4 (for setting the constant current for the condition when the electric motor is eventually impeded), an electric motor impedance torque setting circuit 5, an information output circuit 6, a regulated-voltage power supply circuit 7, and a control circuit 9 and may be selectively added with an electric motor operating temperature detection circuit 8. The regulated-voltage power supply circuit 7 supplies electric power to the control circuit 9 and the control circuit 9 employs integrated circuit(s) to carry out various functions of reading information detection sources, processing, and instruction for execution of torque control. Output terminals of the reference voltage generation circuit 3, the maximum electric motor current setting circuit 4, the electric motor operating temperature detection circuit 8, and the electric motor impedance torque setting circuit 5 are respectively connected to corresponding input terminals of the integrated circuit. The integrated circuit signals and controls the electric motor driving circuit 1 and the reference voltage generation circuit 3 respectively and outputs instant electric motor torque value to the information output circuit 6. The electric motor driving circuit 1 is connected to an electric motor driving circuit of an electric motor 10. And, an input terminal of the maximum electric motor current setting circuit 4 is connected to connection between the electric motor operating current detection circuit 2 and electric motor driving circuit 1, and an output terminal of the maximum electric motor current setting circuit 4 other than that connected to the integrated circuit is connected to a gate control terminal of the electric motor driving circuit 1. The reference voltage generation circuit 3 has a reference voltage output terminal connected to the maximum electric motor current setting circuit 4.

The information output circuit 6 as shown in the drawings is realized with a display screen. The electric motor driving circuit 1 comprises a diode connected in parallel to the electric motor 10 and a semiconductor power device 12 connected in serial between the electric motor 10 and the electric motor operating current detection circuit 2. A gate of the device 12 is connected to the maximum electric motor current setting circuit 4 and a corresponding output terminal of the control circuit 9. When a power tool with the electric motor 10 built therein actuates a power tool control switch SW1, a regulated voltage power source is established through regulated-voltage power supply circuit 7 for being provided to the control circuit 9. Once the regulated voltage power source is established, the control circuit 9 controls the semiconductor power device 12 to maintain/cut off turn-on of the electric motor 10.

The control circuit 9 first obtains a preset impedance torque value from the electric motor impedance torque setting circuit 5 and shows the preset impedance torque via the information output circuit 6, and also obtains a current electric motor temperature from the electric motor operating temperature detection circuit 8. The control circuit 9 then uses a look-up table (curve) of temperature, voltage, torque, and current that is built in or loaded in the integrated circuit to determine a corresponding comparison voltage and the control circuit 9 instructs the reference voltage generation circuit 3 to output a reference voltage to the maximum electric motor current setting circuit 4.

When the comparison voltage reaches a desired value, the control circuit 9 actuates the semiconductor power device 12 to conduct on the circuit of the electric motor 10, causing the rotation of the electric motor 10. The output of the electric motor is subjected to increased impedance due to a bolt or screw being tightened, leading to reduction of rotational speed and increase of current. The current flowing through the electric motor operating current detection circuit 2 is converted into a voltage that is supplied to the maximum electric motor current setting circuit 4. At the time when the current has not reaches the value of the reference voltage, the semiconductor power device 12 maintains the conduction-on of the circuit of the electric motor 10, making the electric motor 10 continuously rotating. At the time when the voltage corresponding to the current exceeds or corresponds to the reference voltage, the maximum electric motor current setting circuit 4 issues a cut-off signal to the gate of the semiconductor power device 12 to thereby instantaneously turn off the electric motor 10, making the current flowing through the electric motor 10 lowering or disappearing, and the control circuit 9 receiving the information that the current reaches the preset value also instantaneously instruct the semiconductor power device 12 to cut off the circuit of the electric motor 10, making the detected value of voltage corresponding to the current lower than the reference voltage. The maximum electric motor current setting circuit 4 again output a signal for actuating the semiconductor power device 12 to turn on the electric motor 10, thereby re-starting the rotation of the electric motor 10. Shortly thereafter, the current increases again due to being subjected to impedance and the voltage corresponding to the current exceeds the reference voltage again, making the operation of the electric motor 10 stopped. In this way, as being controlled by the reference voltage value, the electric motor 10 fast and alternately repeats turn-on and turn-off of the operation thereof, which makes the maximum operating current flowing through the electric motor 10 maintained at a preset value. Further, the operation of the control circuit 9 that instructs the semiconductor power device to cut off the electric motor driving circuit 1 can be alternatively realized with pulse width modulation (PWM) techniques so that the electric motor 10 does not get burned down in a continuous full voltage operation condition due to an increased maximum operating voltage rating when the number of batteries is increased.

In an impact process for tightening screw/bolt, the control circuit 9, when obtaining variation of detection current ratio from the output of the maximum electric motor current setting circuit 4 and the electric motor operating current detection circuit 2, can determine if the impact force reaches a preset value. Once it is determined that the preset value is reached, the control circuit 9 starts automatic time counting. After a short preset elapse of waiting time (which waiting time corresponds to the count of impact and is a memorized time counting value that is input to the control circuit 9 for conditional starting up), a cut-off signal is issued to the semiconductor power device 12, stopping the operation of the electric motor 10. At this time, due to the impedance being fixed and also due to the current being fixed at the preset value, the final average power output from the electric motor 10 is almost constant, making the screw/bolt finally set at the desired impacting tightening torque. With adjustment of the time counting value set in the control circuit 9, fine tune and control for more precise torque value can be realized.

The integrated circuit of the control circuit 9 can carry out various functions and can cooperate with the information output circuit 6 for displaying information to users so that the information output circuit 6 can display preset torque value, calibrated torque value, final torque value or final average power, and also and additionally provide for example expanded functions, including providing further protection to the batteries, wherein when the voltage level of the batteries gets lower to a given extent, the torque setting is not allowed to get higher than a corresponding level and when the temperature of the batteries exceeds a preset value, the torque setting is not allowed to get higher than a corresponding level. To ensure precision of torque and to eliminate the influence caused by variation among individual tools and parts, the establishment of the look-up table of temperature, torque, and current can be done by obtaining actual curves among temperature, torque, and current with empirical tests on each individual tool by means of an integrated circuit of each individual microprocessor and loading the curves in the tool, which is often referred to as in-circuit programming.

Figure 2:
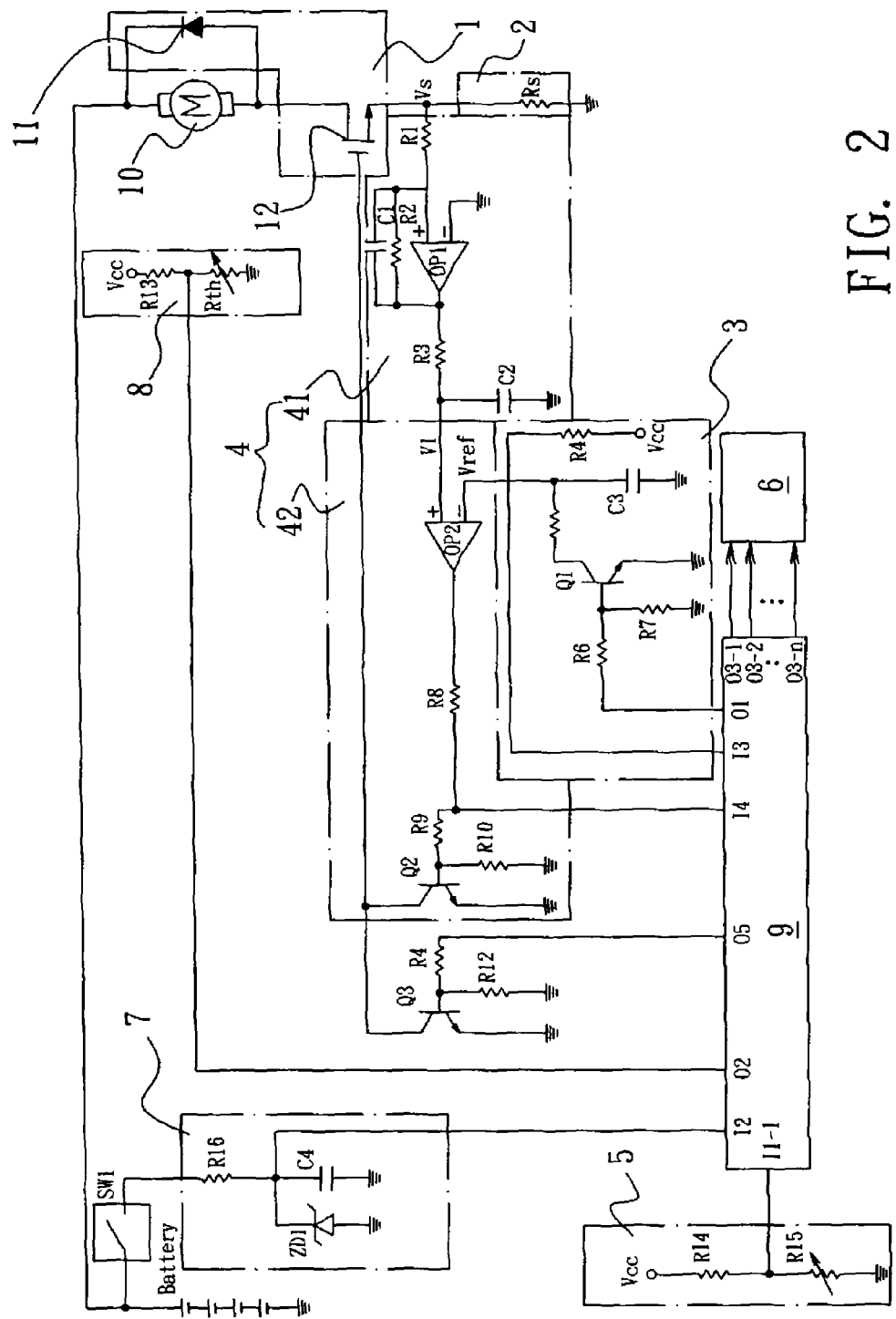
FIG. 2 is a circuit diagram of the torque control circuit for impact tool in accordance with the present invention.

As to the detailed circuits of the present invention, reference is made to FIG. 2 for respective descriptions of the circuits.

(1) The electric motor operating current detection circuit 2 is a low-ohm power resistor Rs. When current flows through the electric motor driving circuit 1, an operating voltage Vs is induced in the low-ohm power resistor Rs. As shown in the drawings, the low-ohm power resistor Rs is a metal-oxide-semiconductor field effect transistor (MOSFET) or a bipolar power transistor having equivalent performance.

(2) The reference voltage generation circuit 3 is formed by a first transistor Q1 having a base connected in serial by a sixth resistor R6 to a corresponding output terminal of the control circuit 9, a collector connected in serial by a fifth resistor R5 to a corresponding node of the maximum electric motor current setting circuit 4, an emitter that is grounded; further cross connected to between the first transistor Q1 and the sixth resistor R6 is a seventh resistor, and cross connected to the connection of the fifth resistor R5 to the corresponding input terminal of the control circuit 9 is a third capacitor C3 that is grounded, as well as a fourth resistor R4 connected to power supply voltage.

(3) The maximum electric motor current setting circuit 4 is composed of two operational amplifier circuits: The first operational amplifier circuit 41 is formed by a first operational amplifier OP1 having a negative input terminal grounded; a positive input terminal and an output terminal between which a second resistor R2 and a first capacitor C1 are connected in parallel, the positive input terminal connected in serial to a first resistor R1 to further connect to between the electric motor operating current detection circuit 2 and the electric motor driving circuit 1, the output terminal further connected with a third resistor R3 that is grounded via a second capacitor C2, the connection between the second capacitor C2 and the third resistor R3 cross connected to the second operational amplifier circuit 42. With the first operational amplifier circuit 42, an operating voltage Vs is filtered and amplified to a to-be-compared voltage V1. The second operational amplifier circuit 42 is formed by a second operational amplifier OP2 having a positive input terminal connected to the third resistor R3; a negative input terminal connected to the fifth resistor R5 of the reference voltage generation circuit 3 to receive the reference voltage Vref supplied from the control circuit 9 and the reference voltage generation circuit 3; an output terminal connected in serial by the eighth resistor R8 to a corresponding input terminal of the control circuit 9 and in further cross connection with a ninth resistor R9 to a base of a second transistor Q2, the connection between the ninth resistor R9 and the base of the second transistor Q2 further cross connected to a tenth resistor R10 for grounding, an emitter of the second transistor Q2 being grounded and a collector of the second transistor Q2 being connected to the gate of the semiconductor power device 12. With the second operational amplifier circuit 42, the to-be-compared voltage V1 is compared with the reference voltage Vref. When the to-be-compared voltage V1 is lower than the reference voltage Vref, a low electric level is supplied to the second transistor Q2 to cut off the conduction of the second transistor Q2 thereby making the previously described semiconductor power device 12 maintain the turn-on and operation of the electric motor 10. On the other hand, when the to-be-compared voltage V1 is higher than the reference voltage Vref, a high electric level is supplied to the second transistor Q2 to conduct on the second transistor Q2 thereby cutting off the conduction of the previously described semiconductor power device 12 and thus cutting off power supplied to and stopping operation of the electric motor 10.

(4) The electric motor impedance torque setting circuit 5 is formed by a variable resistor R15 having an end connected to a corresponding input terminal of the control circuit 9 and connected to the power supply voltage via a fourteenth resistor R14 with an end of the variable resistor R15 other than that connected to the control circuit 9 being grounded. An adjustable section of the variable resistor 15 is exposed outside a housing of the tool to form a hand operating knob or operation bar and cooperate with the displaying of the information output circuit 6 for pre-setting of torque and calibration.

(5) The information output circuit 6 can be STN added with a driving transistor and interface to connect to the control circuit 9. All these can be done with standard and known circuit so that further description is not needed herein and in the drawings.

(6) The regulated-voltage power supply circuit 7 is formed by a sixteenth resistor R16 having an end connected to a power tool control switch SW1 and an opposite end connected in serial to a fourth capacitor C4 and grounded, and the connection of the fourth capacitor C4 to the sixteenth resistor R16 is in cross-connection with a Zener diode ZD1 that is grounded and is further in cross connection with a corresponding power supply voltage input terminal of the control circuit 9.

(7) The electric motor operating temperature detection circuit 8 is formed by power supply voltage that is connected to the ground by a thirteenth resistor R13 connected in serial with a thermal resistor Rth and the connection between the thirteenth resistor R13 and the thermal resistor Rth being in cross-connection with a corresponding terminal of the control circuit 9. Experiments show that the present invention surely provides precise control of torque. With the advance of technology, highly integrating of various software and hardware can be realized on a single control panel. Thus, the above described torque setting circuit 5, information output circuit 6, and control circuit 9 can be all integrated in a single control panel. Further, the torque setting circuit 5 is not limited to an adjustable interface configuration made up of the variable resistor R15 and can be replaced with a digital-logic pushing and controlling means to adjust the torque or using an information output circuit 6 featuring a screen of touch control based adjustment of torque setting to completely replace the physical torque setting circuit 5.

As to the power tool control switch SW1 which is a simple switch for functioning to turn off or turn on and can be replaced by a VSR switch. In case that the electric motor 10 needs to rotate in a reversed direction, then a direction switch can be added. Since the VSR switch and the direction switch are both standard and known parts and can be connected with known configuration, there is no need to further describe herein.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A torque control circuit of impact tool characterized by comprising an electric motor driving circuit, an electric motor operating current detection circuit, a reference voltage generation circuit, a maximum electric motor current setting circuit, an electric motor impedance torque setting circuit, an information output circuit, a regulated-voltage power supply circuit, and a control circuit, wherein the regulated-voltage power supply circuit supplies power supply voltage and the control circuit comprises an integrated circuit to carry out functions of reading information detection sources, processing, and instruction for execution of torque control, output terminals of the reference voltage generation circuit, the maximum electric motor current setting circuit, and the electric motor impedance torque setting circuit being respectively connected to corresponding input terminals of the integrated circuit, the integrated circuit signaling and controlling the electric motor driving circuit and the reference voltage generation circuit respectively and outputting an instant electric motor torque value to the information output circuit, the electric motor driving circuit being connected to an electric motor and connected in serial to the electric motor operating current detection circuit, an input terminal of the maximum electric motor current setting circuit being connected to connection between the electric motor operating current detection circuit and electric motor driving circuit, an output terminal of the maximum electric motor current setting circuit other than that connected to the integrated circuit being connected to a gate control terminal of the electric motor driving circuit.

2. The 1 torque control circuit of impact tool as claimed in claim 1, wherein the electric motor driving circuit comprises a diode connected in parallel to the electric motor and a semiconductor power device connected in serial between the electric motor and the electric motor operating current detection circuit and wherein a gate of the semiconductor power device is connected to the maximum electric motor current setting circuit and a corresponding output terminal of the control circuit.

3. The torque control circuit of impact tool as claimed in claim 1, wherein the electric motor operating current detection circuit comprises a low-ohm power resistor.

4. The torque control circuit of impact tool as claimed in claim 1, wherein the reference voltage generation circuit is formed by a first transistor having a base connected in serial by a sixth resistor to a corresponding output terminal of the control circuit, a collector connected in serial by a fifth resistor to a corresponding node of the maximum electric motor current setting circuit, an emitter that is grounded and wherein a seventh resistor is cross connected to connection between the first transistor and the sixth resistor, and a third capacitor that is grounded and a fourth resistor that is connected to the power supply voltage are cross connected to the connection of the fifth resistor to the corresponding input terminal of the control circuit.

5. The torque control circuit of impact tool as claimed in claim 1, wherein the maximum electric motor current setting circuit comprises first and second operational amplifier circuits:
the first operational amplifier circuit being formed by a first operational amplifier having a negative input terminal grounded, and a positive input terminal and an output terminal between which a second resistor and a first capacitor are connected in parallel, the positive input terminal connected in serial to a first resistor to further connect to connection between the electric motor operating current detection circuit and the electric motor driving circuit, the output terminal further connected with a third resistor that is grounded via a second capacitor, connection between the second capacitor and the third resistor in cross connection with the second operational amplifier circuit, the second operational amplifier circuit being formed by a second operational amplifier having a positive input terminal connected to the third resistor, a negative input terminal connected to the fifth resistor of the reference voltage generation circuit, and an output terminal connected in serial by the eighth resistor to a corresponding input terminal of the control circuit and in further cross connection with a ninth resistor to a base of a second transistor, the connection between the ninth resistor and the base of the second transistor being in further cross connection with a tenth resistor for grounding, an emitter of the second transistor being grounded and a collector of the second transistor being connected to the gate of the semiconductor power device.

6. The torque control circuit of impact tool as claimed in claim 1, wherein the electric motor impedance torque setting circuit is formed by a variable resistor having an end connected to a corresponding input terminal of the control circuit and connected to the power supply voltage via a fourteenth resistor, an end of the variable resistor other than that connected to the control circuit being grounded.

7. The torque control circuit of impact tool as claimed in claim 1, wherein the information output circuit comprises an STN added with a driving transistor and an interface to connect to the control circuit.

8. The torque control circuit of impact tool as claimed in claim 1, wherein the regulated-voltage power supply circuit is formed by a sixteenth resistor connected in serial to a fourth capacitor for grounding, and the connection of the fourth capacitor to the sixteenth resistor being in cross connection with a Zener diode ZD1 that is grounded and being further in cross connection with a corresponding power supply voltage input terminal of the control circuit.

9. The torque control circuit of impact tool as claimed in claim 1, wherein the semiconductor power device comprises a metal-oxide-semiconductor field effect transistor (MOSFET).

10. The torque control circuit of impact tool as claimed in claim 1, wherein the semiconductor power device comprises a bipolar power transistor.

11. The torque control circuit of impact tool as claimed in claim 1, wherein an operation of the control circuit that controls the semiconductor power device to cut off the electric motor driving circuit is realized with pulse width modulation (PWM) techniques.

12. The torque control circuit of impact tool as claimed in claim 1, wherein the torque setting circuit, the information output circuit, and the control circuit are integrated in a single control panel.

13. The torque control circuit of impact tool as claimed in claim 1, wherein the torque setting circuit comprises an adjustable interface configuration comprising digital logic pushing and controlling means.

14. The torque control circuit of impact tool as claimed in claim 1, wherein the information output circuit replaces a physical torque setting circuit and comprises a display screen based adjustable interface configuration featuring touch control adjustment of torque setting.

15. The electric motor impedance torque control and battery discharge protection circuit as claimed in claim 2, wherein when the control circuit obtains variation of detection ratio from output of the maximum electric motor current setting circuit and the electric motor operating current detection circuit that reaches a preset value, automatic time counting is started and after a preset elapse of waiting time, a cut-off signal is issued to the semiconductor power device to stop the operation of the electric motor.

16. A torque control circuit of impact tool characterized by comprising an electric motor driving circuit, an electric motor operating current detection circuit, a reference voltage generation circuit, a maximum electric motor current setting circuit, an electric motor impedance torque setting circuit, an information output circuit, a regulated-voltage power supply circuit, an electric motor operating temperature detection circuit, and a control circuit, wherein the regulated-voltage power supply circuit supplies power supply voltage and the control circuit comprises an integrated circuit to carry out functions of reading information detection sources, processing, and instruction for execution of torque control, output terminals of the reference voltage generation circuit, the maximum electric motor current setting circuit, the electric motor operating temperature detection circuit, and the electric motor impedance torque setting circuit being respectively connected to corresponding input terminals of the integrated circuit, the integrated circuit signaling and controlling the electric motor driving circuit and the reference voltage generation circuit respectively and outputting an instant electric motor torque value to the information output circuit, the electric motor driving circuit being connected to an electric motor and connected in serial to the electric motor operating current detection circuit, an input terminal of the maximum electric motor current setting circuit being connected to connection between the electric motor operating current detection circuit and electric motor driving circuit, an output terminal of the maximum electric motor current setting circuit other than that connected to the integrated circuit being connected to a gate control terminal of the electric motor driving circuit.

17. The 1 torque control circuit of impact tool as claimed in claim 16, wherein the electric motor driving circuit comprises a diode connected in parallel to the electric motor and a semiconductor power device connected in serial between the electric motor and the electric motor operating current detection circuit and wherein a gate of the semiconductor power device is connected to the maximum electric motor current setting circuit and a corresponding output terminal of the control circuit.

18. The torque control circuit of impact tool as claimed in claim 16, wherein the electric motor operating current detection circuit comprises a low-ohm power resistor.

19. The torque control circuit of impact tool as claimed in claim 16, wherein the reference voltage generation circuit is formed by a first transistor having a base connected in serial by a sixth resistor to a corresponding output terminal of the control circuit, a collector connected in serial by a fifth resistor to a corresponding node of the maximum electric motor current setting circuit, an emitter that is grounded and wherein a seventh resistor is cross connected to connection between the first transistor and the sixth resistor, and a third capacitor that is grounded and a fourth resistor that is connected to the power supply voltage are cross connected to the connection of the fifth resistor to the corresponding input terminal of the control circuit.

20. The torque control circuit of impact tool as claimed in claim 16, wherein the maximum electric motor current setting circuit comprises first and second operational amplifier circuits:
the first operational amplifier circuit being formed by a first operational amplifier having a negative input terminal grounded, and a positive input terminal and an output terminal between which a second resistor and a first capacitor are connected in parallel, the positive input terminal connected in serial to a first resistor to further connect to connection between the electric motor operating current detection circuit and the electric motor driving circuit, the output terminal further connected with a third resistor that is grounded via a second capacitor, connection between the second capacitor and the third resistor in cross connection with the second operational amplifier circuit, the second operational amplifier circuit being formed by a second operational amplifier having a positive input terminal connected to the third resistor, a negative input terminal connected to the fifth resistor of the reference voltage generation circuit, and an output terminal connected in serial by the eighth resistor to a corresponding input terminal of the control circuit and in further cross connection with a ninth resistor to a base of a second transistor, the connection between the ninth resistor and the base of the second transistor being in further cross connection with a tenth resistor for grounding, an emitter of the second transistor being grounded and a collector of the second transistor being connected to the gate of the semiconductor power device.

21. The torque control circuit of impact tool as claimed in claim 16, wherein the electric motor impedance torque setting circuit is formed by a variable resistor having an end connected to a corresponding input terminal of the control circuit and connected to the power supply voltage via a fourteenth resistor, an end of the variable resistor other than that connected to the control circuit being grounded.

22. The torque control circuit of impact tool as claimed in claim 16, wherein the information output circuit comprises an STN added with a driving transistor and an interface to connect to the control circuit.

23. The torque control circuit of impact tool as claimed in claim 16, wherein the regulated-voltage power supply circuit is formed by a sixteenth resistor connected in serial to a fourth capacitor for grounding, and the connection of the fourth capacitor to the sixteenth resistor being in cross connection with a Zener diode ZD1 that is grounded and being further in cross connection with a corresponding power supply voltage input terminal of the control circuit.

24. The torque control circuit of impact tool as claimed in claim 16, wherein the electric motor operating temperature detection circuit is formed by power supply voltage that is connected to the ground by a thirteenth resistor connected in serial with a thermal resistor, the connection between the thirteenth resistor and the thermal resistor being in cross connection with a corresponding terminal of the control circuit.

25. The torque control circuit of impact tool as claimed in claim 16, wherein the semiconductor power device comprises a metal-oxide-semiconductor field effect transistor (MOSFET).

26. The torque control circuit of impact tool as claimed in claim 16, wherein the semiconductor power device comprises a bipolar power transistor.

27. The torque control circuit of impact tool as claimed in claim 16, wherein an operation of the control circuit that controls the semiconductor power device to cut off the electric motor driving circuit is realized with pulse width modulation (PWM) techniques.

28. The torque control circuit of impact tool as claimed in claim 16, wherein the torque setting circuit, the information output circuit, and the control circuit are integrated in a single control panel.

29. The torque control circuit of impact tool as claimed in claim 16, wherein the torque setting circuit comprises an adjustable interface configuration comprising digital logic pushing and controlling means.

30. The torque control circuit of impact tool as claimed in claim 16, wherein the information output circuit replaces a physical torque setting circuit and comprises a display screen based adjustable interface configuration featuring touch control adjustment of torque setting.

31. The torque control of impact tool as claimed in claim 17, wherein when the control circuit obtains variation of detection ratio from output of the maximum electric motor current setting circuit and the electric motor operating current detection circuit that reaches a preset value, automatic time counting is started and after a preset elapse of waiting time, a cut-off signal is issued to the semiconductor power device to stop the operation of the electric motor.

\* \* \* \* \*